United States Patent
Kumada et al.

[11] 3,813,144
[45] May 28, 1974

[54] METHOD AND DEVICE FOR COLOR MODULATION

[75] Inventors: Akio Kumada, Kodaire; Sakichi Ashida, Fuchu; Keiichiro Aizu, Tokyo; Masaahi Koga, Kokubunji, all of Japan

[73] Assignee: Hitachi, Ltd., Tokyo, Japan

[22] Filed: Apr. 4, 1972

[21] Appl. No.: 241,073

Related U.S. Application Data
[63] Continuation of Ser. No. 810,162, March 25, 1969, abandoned.

[30] Foreign Application Priority Data
Mar. 30, 1968 Japan.............................. 43-20814
Sept. 13, 1968 Japan.............................. 43-65582
Oct. 5, 1968 Japan.............................. 43-72476

[52] U.S. Cl.............................. 350/150, 350/157
[51] Int. Cl...................... G02b 22/28, G02f 1/26
[58] Field of Search................ 350/150; 340/173 LC

[56] References Cited
UNITED STATES PATENTS

| | | | |
|---|---|---|---|
| 2,493,200 | 1/1950 | Land.............................. | 350/150 X |
| 2,936,380 | 5/1960 | Anderson....................... | 350/150 X |
| 3,374,473 | 3/1968 | Cummins........................ | 350/150 X |
| 3,437,432 | 4/1969 | Borchardt..................... | 350/150 UX |
| 3,501,219 | 3/1970 | Caulfield........................ | 350/150 |
| 3,559,185 | 1/1971 | Burns et al..................... | 350/157 X |

OTHER PUBLICATIONS

Zwicker et al. "Elektrooptische Eigenschaften der Seignette-elektrischen Kristalle $KH_2PO_4$ und $KD_2PO_4$" Helv. Phys. Acta Vol. 17, 1944, pp. 346–373.
"Electrical Color Filters" Electronics Vol. 23, No. 11, pp. 112–115, Nov., 1950.
Kanzig "Ferroelectrics an Antiferroelectrics" Solid State Physics. Vol. 4, Ed. Seitzz and Turnbull (Academic Press, Inc., New York, 1957) pp. 5–20, 51–55, 65–68, 88–97 relied on. QC. 173, S 6.
Borchardt et al. "$Gd_2(MoO_4)_3$: A Ferroelectric Laser Host" Applied Physics Letters Vol. 8, No. 2, Jan. 15, 1966, pp. 50–52.
Cummins "A New Bistable Ferroelectric Light Gate or Display Element" Proceedings of the IEEE Vol. 55, Aug. 1967, pp. 1337,1338.
Cross et al. "Gadolinium Molybdate, A New Type of Ferroelectric Crystal" Physical Review Letters Vol. 21, No. 12, Sept. 16, 1968, pp. 812–814.

*Primary Examiner*—John K. Corbin
*Attorney, Agent, or Firm*—Craig & Antonelli

[57] ABSTRACT

A method and a device for color modulation in which an irregular ferroelectric material is used as a color modulator, on which an electric field higher than the threshold field of the monocrystal of said material is imposed to cause the spontaneous polarization to be reversed, the change in the biaxial birefringence of said irregular ferroelectric material caused by the polarization reversal being utilized to vary the retardation of one of the two refracted rays from the other in the course of transmission through said color modulator and thereby to vary the interference color.

31 Claims, 13 Drawing Figures

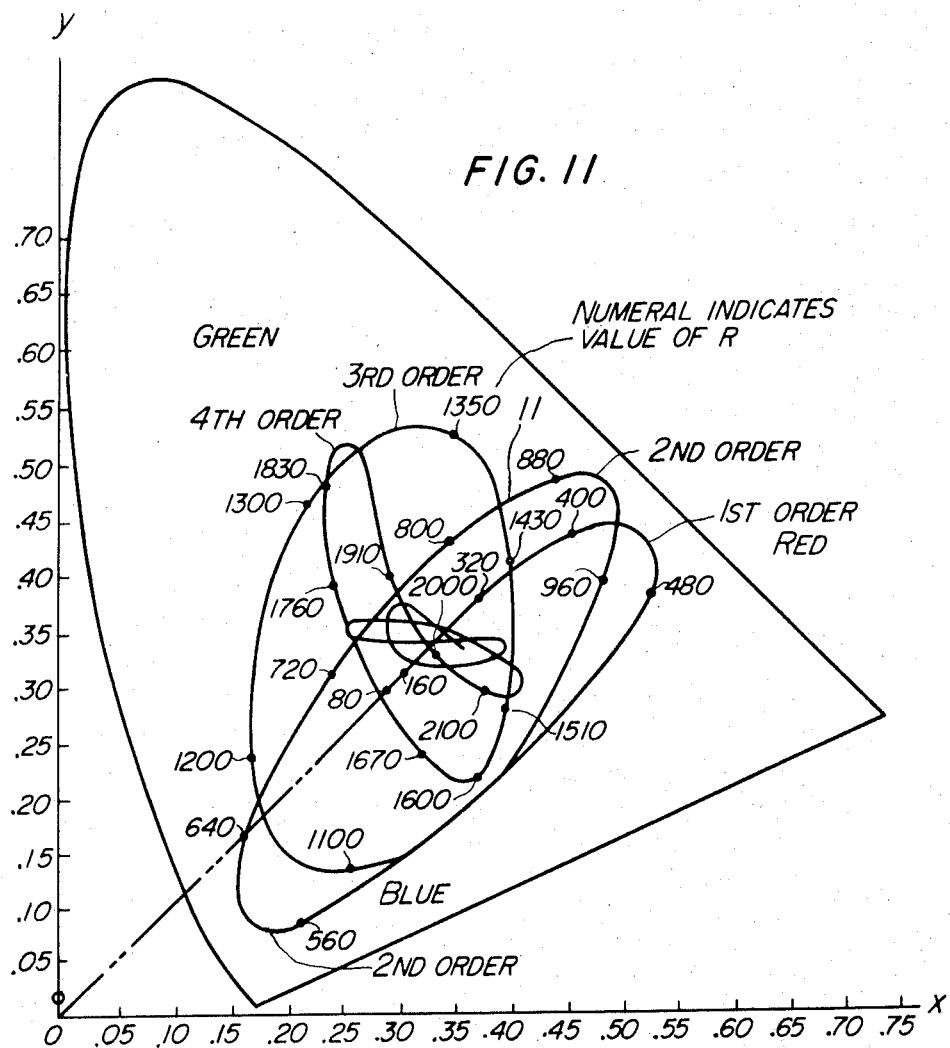

METHOD AND DEVICE FOR COLOR MODULATION

This is a continuation application of application Ser. No. 810,162 filed Mar. 25, 1969, now abandoned.

This invention relates to a color modulator utilizing an irregular ferroelectric material.

Principle, features and embodiments of this invention will be described in detail hereunder with reference to the accompanying drawings, in which;

FIG. 11 is a CIE chromaticity chart indicating the relation between the color interference and the retardation of the transmitted light in the color modulation device of this invention in which the irregular ferroelectric crystal is disposed between two polarizing plates which are positioned in cross-polar relation;

Figure 1:
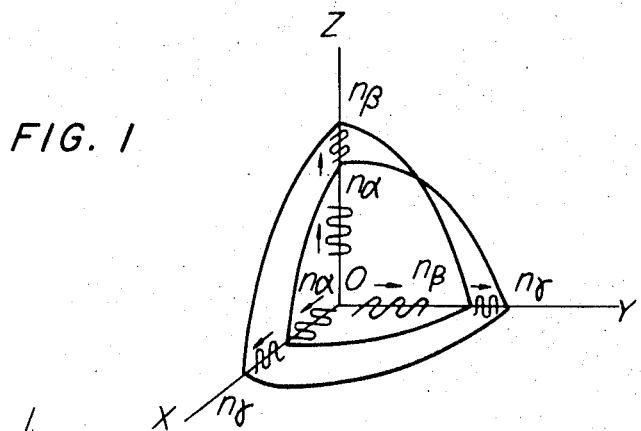
FIG. 1 shows a section of the indicatrix ellipsoid of a biaxial birefringent crystal.

As is well-known, a ray of light incident on an optically biaxial birefringent crystal is separated into two extraordinary rays exhibiting different refractive indices. The planes of vibration of said two extraordinary rays are mutually orthogonal. Assuming that the opto-elastic principal axes of this crystal are indicated respectively by X, Y and Z, and that refractive indices for three pairs of birefringent rays resulting from three rays incident along said three principal axes are indicated respectively by $n_\alpha$, $n_\gamma$ ; $n_\beta$, $n_\gamma$ ; $n_\alpha$, $n_\beta$ ; the indicatrix ellipsoid of the crystal will be as shown FIG. 1.

In a crystal having such an indicatrix ellipsoid, the retardation of one extraordinary ray from the other while an incident ray along an opto-elastic principal axis travels through the crystal over a distance $d$, is expressed by the following formulas as to each principal axis:

$$R_x = d(n_\gamma - n_\beta)$$
$$R_y = d(n_\gamma - n_\alpha)$$
$$R_z = d(n_\beta - n_\alpha) \qquad 1.$$

where $n_\alpha$, $n_\beta$, $n_\gamma$ indicate refractive indicatrixes of the polarized light rays whose vibration planes are parallel respectively to X, Y, Z axes.

The principle of the interference of the light rays transmitted through a biaxial birefringent crystal will be explained hereunder with reference to FIG. 2.

For example, a Z-cut birefringent crystal 3 (a crystal cut with both main surfaces perpendicular to the Z axis) having thickness $d$ is placed between a polarizer 1 (e.g. a Nicol prism) and an analyser 2 disposed with their directions of polarization crossed, that is, in so-called cross-polar relation, said main surfaces of the crystal being positioned to be parallel with said polarizer 1 and analyser 2, and a ray of light 4 is directed perpendicularly to the polarizer 1. If the crystal 3 is rotated around the Z axis until its X axis (or Y axis) coincides with the plane of polarization PP' of the polarizer 1, the light transmitted through the analyser 2 will become zero, as the vibration direction of the light passing the crystal 3 is the same as the transmitting axis PP' of the polarizer 1. However, if the crystal 3 is further rotated, for example, clockwise, the light transmitted through the crystal will become elliptically polarized first clockwise, then counter-clockwise and finally, after rotation of 180°, become linearly polarized, while the amount of light transmitted through the analyser 2 varies depending on said variation in the polarization of the light.

When monochromatic light is transmitted through an optical system consisting of a birefringent crystal disposed between a polarizer and an analyser as described above, the transmissivity of the light depends on the thickness of the crystal and inclination of the polarizer and analyser relative to the crystallographic axis of the crystal. Now, assuming that the incident light has a continuous spectrum ranging over the whole visible light as is the case with the white light from an incandescent lamp, and that the polarizer and the analyser are positioned with their polarizing directions PP' and AA' mutually crossed as shown in FIG. 2 and further, 45° inclined in relation to the opto-elastic principal axes X, Y of the biaxial crystal, light waves having wavelengths determined by the following formula will have been linearly polarized when they come out of the crystal plate, the vibration plane of such lightrays being parallel with the axis PP' of the polarizer and perpendicular to the axis AA' of the analyzer:

$$k\lambda_0 = d(n_\beta - n_\alpha) \qquad 2.$$

(where $k$ indicates an integer number and $\lambda_0$ the wavelength of the incident light.)

Therefore, these light waves are completely interrupted by the analyser. On the other hand, light waves having wavelengths determined by the following formula also will have been linearly polarized when they emerge from the crystal plate:

$$(2k+1)(\lambda_0/2) = d(n_\beta - n_\alpha) \qquad 3.$$

However, the vibration plane of these light rays is perpendicular to the axis PP' of the polarizer. Therefore, these light rays go through the analyser unaffected.

Meanwhile, light rays having other wavelengths than those determined by the above formulas (2), (3) will have been elliptically or circularly polarized when they emerge from the crystal plate, and a portion of the light rays go through the analyser 2. Therefore, in the spectrum of the light emerging from the analyser 2, particular wavelengths (corresponding to those determined by formula (2)) will be missing, while other particular wavelengths (determined by formula (3)) will be emphasized, and thus, the light appears to be colored.

On the other hand, if it is assumed that the polarizer 1 and the analyser 2 are positioned with their polarizing directions mutually parallel instead of crossed and here again 45° inclined to the opto-elastic principal axes X, Y of the crystal 3, then said formula (3) gives the wavelengths of minimum intensity and formula (2) defines the strongest wavelengths. Therefore, with this arrangement the color of the transmitted light is complementary of the color in the preceding case.

Assuming that $\lambda_1$ and $\lambda_2$ indicate two adjacent wavelengths which give peak intensity, the following conditions are fulfilled:

$(k + \frac{1}{2}) \lambda_1 = d (n_\beta - n_\alpha)$
$(k + 3/2) \lambda_2 = d (n_\beta - n_\alpha)$ Therefore, $\lambda_1/\lambda_2 = 1 + [ 1/k + \frac{1}{2}] = 1 + [(\lambda_1/d(n_\beta - n_c))]4$.

It will be seen from the above formula that the ratio $\lambda_1/\lambda_2$ for a given value of $\lambda_1$ assumes a comparatively large value if $d$ is small, but it approaches 1 as $d$ becomes large. Thus, if the crystal is very thin, the width of the output spectrum which includes $\lambda_1$ as the peak wavelength therein will be considerably broad, covering the whole visible range almost evenly. Accordingly, the transmitted light appears to be nearly white. With an appropriate thickness $d$ of the crystal, the interval between the wavelength of maximum intensity and that of minimum intensity in the spectrum of the transmitted light becomes a proper value, and the light is distinctly colored. However, if the thickness of the crystal is increased, the above-mentioned interval in the spectrum will become so narrow that the light includes a number of line spectrums of different colors, thus the distinct color will be lost. In fact, if the crystal is considerably thick, the transmitted light appears almost white for untrained eyes and the recognition of the colored elements in the spectrum is possible only by the use of a spectroscope. That is, if the arrangement as shown in FIG. 2 is deemed as a filter for transmitting monochromatic light, the thickness d of the crystal has an optimum value. For example, a relation between the retardation R ($R = \Delta n \cdot \alpha$) and the interference color as described above is shown in the following Table 1.

Table 1

| R (mµ) | Interference color | R (mµ) | Interference color |
|---|---|---|---|
| 490 | Red | 990 | Red |
| 530 | Purple | 1170 | Blue |
| 650 | Blue | 1310 | Green |
| 705 | Azure | 1400 | Yellow |
| 765 | Green | 1840 | Green |
| 855 | Yellow | 2000 | White |

With a device as described above referring to FIG. 2, however, color modulation or change of the interference color has not been achieved hitherto unless the relative position of the crystal is actually changed.

The inventors of this application have discovered that if a rare type of ferroelectric material (that is, an irregular ferroelectric material) is used for the biaxial birefringent crystal in the above arrangement and if the spontaneous polarization is reversed by an appropriate means, the retardation between two components of the transmitted light varies and thus the interference color changes.

Therefore, an object of this invention is to provide a method for modulating color of the light transmitted through a crystal of a ferroelectric material.

Another object of this invention is to provide a device for modulating color of the light transmitted through a crystal of a ferroelectric material.

Another object of this invention is to further improve the above-mentioned color modulation method.

Still another object of this invention is to further improve the above-mentioned color modulation device.

A further object of this invention is to provide a color modulation device which produces the three primary colors (red, blue and green) on the basis of the above-mentioned color modulation method.

In order to achieve the above objects, the color modulation method of this invention utilizes an irregular ferroelectric crystal having biaxial birefringence, on which an electric field at least equal in intensity to the coercive electric field of said crystal is imposed through an appropriate electrical modulation means, so that the interference color resulting from the transmission of light through said crystal is modulated.

Figure 3:
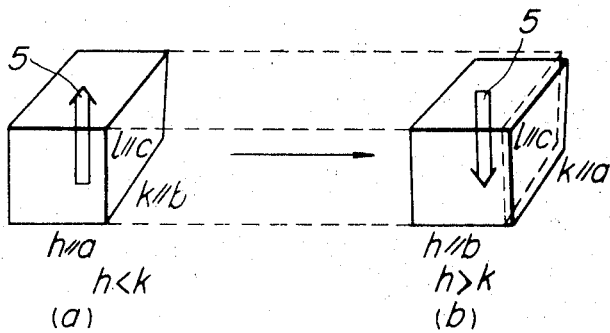
FIG. 3 is an explicative drawing which shows deformation of the unit cell of an irregular ferroelectric crystal when said crystal undergoes the polarization reversal.

The inventors of this invention, who had been studying the nature of ferroelectric materials for many years, found the fact that a certain kind of ferroelectric crystal such as potassium dihydrogen phosphate (hereinafter, referred to as KDP) and gadolinium molybdate (hereinafter, referred to as GMO), unlike known ferroelectric materials such as triglycine sulfate, lead zircontitanate and barium titanate, have a property of reversing the spontaneous polarization 5 as shown in FIG. 3 when an electric field or a stress larger than a particular constant value (this value is referred to as the coercive field or coercive stress, respectively) is imposed thereon.

Generally in a ferroelectric crystal, the spontaneous polarization, that is, an electric polarization in the state of no stress and no electric field can be reversed from the state (a) in FIG. 3 to the state (b) or inversely from the state (b) to the state (a) by applying an electric field. In some of the ferroelectric crystals, the strain in the crystal lattice varies depending on the direction of the spontaneous polarization. Such a ferroelectric crystal will be referred to as an irregular ferroelectric crystal hereinafter. On the other hand, a ferroelectric crystal of which the strain in the lattice is not related to the direction of the spontaneous polarization is called a regular ferroelectric crystal. Referring to FIG. 3 in which $h$, $k$ and $l$ indicate the length of the edges of the crystal along the crystallographic axes $a$, $b$ and $c$ respectively, the crystal in the state (a) is expanded in the direction along the axis $b$, while in the state (b), it is elongated in the direction along the axis $a$. That is, the crystal in the state (a) corresponds to that in the state (b) rotated 90° around the axis $c$. With this displacement in the dimensions, other properties of the crystal change accordingly.

Figure 4:
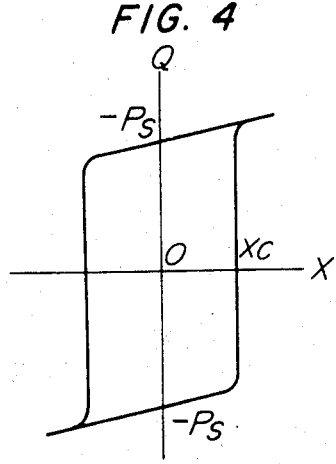
FIG. 4 shows the hysteresis loop of stress vs electrification characteristics of an irregular ferroelectric crystal.
Figure 5:
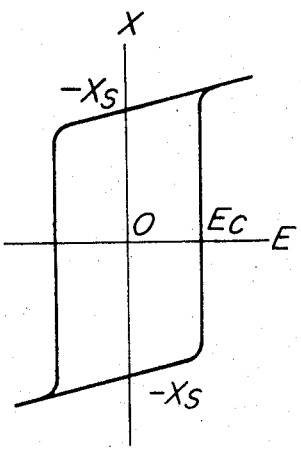
FIG. 5 shows the hysteresis loop of strain vs electric field characteristics of an irregular ferroelectric crystal.

There are basically two methods for transforming an irregular ferroelectric crystal from one state to the other or vice versa. According to one method, a crystal which is in the state (a) of FIG. 3 is given a compressive force in the direction of the axis b to cause a strain. If the compressive force exceeds a particular value, the crystal will be transformed to the state (b), and polarity of the electrification on both end surfaces perpendicular to the direction of the spontaneous polarization will be reversed. This phenomenon corresponds to the generation of electric charge or electromotive force due to a mechanical stress. In this case, the relation between the stress X and the density of the electric charge is expressed by a hysteresis loop as shown in FIG. 4, and both states (a) and (b) are stable without electric field or mechanical stress. The other method for transforming the state of the crystal is to impose an electric field on the crystal in the direction opposite to that of the spontaneous polarization as described previously. In this case, the relation between the electric field and the mechanical strain is as shown in FIG. 5, also indicating a hysteresis characteristics.

As is well known, in an irregular ferroelectric crystal, the relation between the mechanical stress and strain also shows hysteresis characteristics. Such a mechanical behavior is entirely different from the elasticity or plasticity of ordinary material, and it is a property rather comparable with ferroelectricity or ferromagnetism. Therefore, it may be called "ferroelasticity", and an irregular ferroelectric crystal may be referred to as a ferroelectric and concurrently ferroelastic material. The inventors of this application have found that some crystals belonging to the point groups $mm2$, 2–I and 1–II fall within the category of the irregular ferroelectric materials. The following Table 2 lists these crystals under the respective group indexes $imm2$, $i2$–I and $i2$–II of such crystals.

TABLE 2

| Point group | Material |
|---|---|
| $imm2$ | KDP, GMO |
| $i2$-I | Not yet discovered |
| $i2$-II | Rochelle salt, Cadmium ammonium sulfate, Dodecyl hydrate of aluminum methyl-ammonium sulfate |

It has been found as a result of research by the present inventors that GMO and crystallographic isomorphs thereof, that is, $(R_x R'_{1-x})_2O_3 \cdot 3MO_{1-e}W_eO_3$ (where, R and R are at least one element of the rare earths, $x$ a number of 0 to 1.0, and $e$ a number of 0 to 0.2) are crystals of ferroelectric ferro-elastic phase belonging to point group $mm2$, have a Curie temperature of approximately 160°C., show irregular ferroelectric characteristics at a temperature ranging from the Curie point to an extremely low temperature, of course covering room temperature, are unsoluble in water, resistive to moisture as well as dehydration, and have a high mechanical strength. Further, the Curie point thereof can be lowered down to the room temperature level by forming an isomorphous solid solution.

In this invention, GMO or its isomorph as described above (hereinafter, referred to as a GMO crystal) which belongs to orthorhombic system crystallographically, is utilized.

Although the U.S. Pat. No. 3,437,432 discloses a single crystal of $(R_xR'_{1-x})_2O_3 \cdot 3Mo_{1-e}We\ O_3$ having the GMO crystal structure, the $a$ axis and the $b$ axis are not identical in the unit cell dimension of said crystal.

The unit cell dimension of GMO used in this invention have been determined using an X-ray goniometer designed for this purpose and according to the X-ray diffraction method, as follows:

$a = ]10.38 \pm 0.005$ A.
$b = 10.426 \pm 0.005$ A.
$c = 10.709 \pm 0.005$ A.

As to $Eu_2(MoO_4)_3$, $Tb_2(MoO_4)_3$, $Dy_2(MoO_4)_3$ and $Sm_2(MoO_4)_3$ which are isomorphous of GMO, it has been found from measurement by the X-ray diffraction method that the unit cell dimension along the $a$ axis is different from that along $b$ axis in all of these crystals as shown in Table 3.

TABLE 3

| Material | $a$ (A) | $b$ (A) | $c$ (A) |
|---|---|---|---|
| $Eu_2(MoO_4)_3$ | 10.377±0.005 | 10.472±0.005 | 10.655±0.005 |
| $Gd_2(MoO_4)_3$ | 10.388±0.005 | 10.426±0.005 | 10.709±0.005 |
| $Dy_2(MoO_4)_3$ | 10.331±0.005 | 10.346±0.005 | 10.603±0.005 |
| $Sm_2(MoO_4)_3$ | 10.478±0.005 | 10.511±0.005 | 10.856±0.005 |

Each single crystal of the above GMO, $Sm_2(MoO_4)_3$, $Eu_2(MoO_4)_3$, $Tb_2(MoO_4)_3$ and $Dy_2(MoO_4)_3$ was cut parallel to the planes (100), (010), (001) respectively perpendicular to the axes $a$, $b$, $c$ and it was poled by imposing an electric field or a mechanical stress thereon, thus being rendered a single domain structure. (This was verified by testing the specimen under a polarized microscope, projecting planar polarized light along the $c$ axis and manipulating the crossed polarizers.) The crystal was put on an X-ray three axes goniometer, and the intensity distribution of the light reflected from the surfaces of the crystal was measured. The planes of which the reflected light was measured, were (4 0 0), (6 0 0), (8 0 0), (1 0 0 0), and also (0 0 3), (0 0 4), (0 0 5). Further, after the measurement of the reflected light, the $a$ axis and $b$ axis of the crystal were interchanged by applying an inverse electric field or stress along the $c$ axis, the single domain structure being maintained. Then again, the intensity distribution of the light reflected from planes (0 4 0), (0 6 0), (0 8 0), (0 1 0 0) was determined under the following measuring conditions. That is, Cu-K$_\alpha$ rays from the X-ray source energized with a voltage of 30 kV and a current of 10 mA were directed to hit the crystal through a divergence slit 10 mm wide, a scatter slit 10 mm wide and an incidence slit 0.1 mm wide. The scanning speed of the goniometer was ¼°/min. and the radius of the Geiger counter used was 185 mm. Further, when the crystal was heated above the Curie temperature thereby to relieve it of the polled state, the difference between the cell dimensions $a$ and $b$ became indistinct.

The irregular ferroelectric crystal used in this invention may be one of the single crystals of chemical compounds which are isomorphous of GMO crystal and solid solutions of such chemical compounds. Several of which have been shown in Table 3.

The structure of such a crystal is greatly affected by the size of the positive ion used therein. If the positive ion is too large or too small, a different structure will be obtained. Arrhenius ion radii of ions of rare earths are as follows: $Sm^{+3}$ 1.00 Å, $Eu^{+3}$ 0.98 Å, $Gd^{+3}$ 0.97 Å, Tb 0.93 Å and Dy 0.92 Å. Therefore, $(R_xR'_{1-x})_2O_3 \cdot 3Mo_{1-e}W_eO_3$ formed with one of these ion radii will have the same GMO crystal structure. The GMO crystal used in this invention belongs to the orthorhombic system and to point group $mm2$ and has a spontaneous strain as follows:

$x_s = [(b \sim a)/(a + b)] > 5 \times 10^{-4}$

A crystal having such unit dimensions is remarkably affected by policy. The GMO crystal used in this invention has properties as shown below:

Color: No color, and transparent
Density: 4,600 kg/m³
Point group: Orthorhombic, mm2, (ferroelectric phase), at a temperature below the Curies point Tetragonal, $\bar{4}$ 2 m, (para-electric phase), at a temperature above the Curie point
Phase transition temp.: 162° ± 3°C.
Melting point: 1,170°C.
Cleaved surface: (1 1 0), (0 0 1)
Relative dielectric constants in the direction of the axes $a$, $b$ and $c$: $\epsilon_c = 10.5$, $\epsilon_a \approx \epsilon_b = 9.5$ (at 20°C.)
Spontaneous polarization: $1.86 \times 10^{-3}$ C/m², (along axis $c$)
Spontaneous strain: $1.5 \times 10^{-3}$
Elastic compliance: $25 \times 10^{-12}$ (m²/Newton)
Coercive field: $6 \times 10^5$ (V/m²)
Coercive stress: $1.4 \times 10^5$ (Newton/m²)
Resistivity to water and chemicals: Good
Efflorescence or diliquescence: None The following Table 4 shows some of the isomorphs of GMO crystal used in this invention. Reaction materials and the amounts thereof required for forming the crystals also are shown in the table.

TABLE 4

| Chemical formula of single crystal | Molybdate | Rare earth | |
|---|---|---|---|
| 2.— $Sm_2(MoO_4)_3$ | 431.8 | ($Sm_2O_3$) | 348.7 |
| 3.— $Eu_2(MoO_4)_3$ | 431.8 | ($Eu_2O_3$) | 352.0 |
| 4.— $Dy_2(MoO_4)_3$ | 431.8 | ($Dy_2O_3$) | 373.0 |
| 5.— $Tb_2(MoO_4)_3$ | 833.6 | ($Tb_2O_3$) | 748.8 |
| 6.— $(Gd_{0.5}Sm_{0.5})_2(MoO_4)_3$ | 431.8 | ($Gd_2O_3$) ($Sm_2O_3$) | 180.9 174.3 |
| 7.— $(Gd_{0.5}Eu_{0.5})_2(MoO_4)_3$ | 431.8 | ($Gd_2O_3$) ($Eu_2O_3$) | 180.9 176.0 |
| 8.— $(Gd_{0.5}Tb_{0.5})_2(MoO_4)_3$ | 431.8 | ($Gd_2O_3$) ($Tb_2O_3$) | 180.9 187.2 |
| 9.— $(Gd_{0.5}Dy_{0.5})_2(MoO_4)_3$ | 431.8 | ($Gd_2O_3$) ($Dy_2O_3$) | 180.9 186.5 |
| 10.— $(Gd_{0.95}Yb_{0.05})_2(MoO_4)_3$ | 431.8 | ($Gd_2O_3$) ($Yb_2O_3$) | 343.7 19.7 |
| 11.— $(Gd_{0.95}Ho_{0.05})_2(MoO_4)_3$ | 431.8 | ($Gd_2O_3$) ($Ho_2O_3$) | 343.7 18.9 |
| 12.— $(Gd_{0.95}Lu_{0.05})_2(MoO_4)_3$ | 431.8 | ($Gd_2O_3$) ($Lu_2O_3$) | 343.7 19.9 |
| 13.— $(Gd_{0.95}Tm_{0.05})_2(MoO_4)_3$ | 431.8 | ($Gd_2O_3$) ($Tm_2O_3$) | 343.7 19.3 |
| 14.— $(Gd_{0.95}Sc_{0.05})_2(MoO_4)_3$ | 431.8 | ($Gd_2O_3$) ($Sc_2O_3$) | 343.7 6.9 |
| 15.— $(Gd_{0.95}La_{0.05})_2(MoO_4)_3$ | 431.8 | ($Gd_2O_3$) ($La_2O_3$) | 343.9 16.3 |
| 16.— $(Gd_{0.95}Pr_{0.05})_2(MoO_4)_3$ | 431.8 | ($Gd_2O_3$) ($Pr_6O_{11}$) | 343.9 17.0 |
| 17.— $(Gd_{0.9}Y_{0.1})_2(MoO_4)_3$ | 431.8 | ($Gd_2O_3$) ($Y_2O_3$) | 217.0 90.3 |
| 18.— $(Gd_{0.6}La_{0.4})_2(MoO_4)_3$ | 431.8 | ($Gd_2O_3$) ($La_2O_3$) | 217.0 130.0 |
| 19.— $(Gd_{0.60}Tb_{0.20}Dy_{0.20})_2(MoO_4)_3$ | 431.8 | ($Gd_2O_3$) ($Dy_2O_3$) ($Tb_4O_7$) | 217.0 74.6 78.8 |
| 20.— $(Gd_{0.70}Eu_{0.20}Dy_{0.10})_2(MoO_4)_3$ | 431.8 | ($Gd_2O_3$) ($Eu_2O_3$) ($Dy_2O_3$) | 253.3 70.4 37.3 |
| 21.— $(Gd_{0.60}Sm_{0.20}Tb_{0.10})_2(MoO_4)_3$ | 431.8 | ($Gd_2O_3$) ($Sm_2O_3$) ($Tb_4O_7$) | 217.0 69.7 39.4 |
| 22.— $(Gd_{0.70}Eu_{0.20}Tb_{0.10})_2(MoO_4)_3$ | 431.8 | ($Gd_2O_3$) ($Eu_2O_3$) ($Tb_4O_7$) | 253.3 70.4 39.4 |
| 23.— $(Gd_{0.7}Y_{0.2}La_{0.1})_2(MoO_4)_3$ | 431.8 | ($Gd_2O_3$) ($La_2O_3$) ($Y_2O_3$) | 253.3 32.6 45.2 |
| 24.— $(Gd_{0.7}Eu_{0.20}Ho_{0.10})_2(MoO_4)_3$ | 431.8 | ($Gd_2O_3$) ($Eu_2O_3$) ($Ho_2O_3$) | 253.3 70.4 37.8 |
| 25.— $(Gd_{0.7}Sm_{0.1}Eu_{0.1}Y_{0.1})_2(MoO_4)_3$ | 431.8 | ($Gd_2O_3$) ($Sm_2O_3$) ($Eu_2O_3$) ($Y_2O_3$) | 253.3 34.9 35.2 22.6 |
| 26.— $(Gd_{0.95}Nd_{0.05})_2(MoO_4)_3$ | 431.8 | ($Gd_2O_3$) ($Nd_2O_3$) | 343.7 16.8 |
| 27.— $(Gd_{0.6}Tb_{0.2}Y_{0.1}La_{0.1})_2(MoO_4)_3$ | 431.8 | ($Gd_2O_3$) ($Tb_4O_7$) ($Y_2O_3$) ($La_2O_3$) | 217.0 78.8 22.6 32.6 |
| 28.— $Gd_2(Mo_{0.95}W_{0.1}O_4)_3(MoO_4)_3$ | 431.8 | $WO_3$ | 70.0 |
| 29.— $(Sm_{0.5}Eu_{0.5})_2(MoO_4)_3$ | 431.8 | ($Sm_2O_3$) ($Eu_2O_3$) | 174.1 176.0 |
| 30.— $(Sm_{0.5}Dy_{0.5})_2(MoO_4)_3$ | 431.8 | ($Sm_2O_3$) ($Dy_2O_3$) | 174.1 186.5 |
| 31.— $(Sm_{0.5}Tb_{0.5})_2(MoO_4)_3$ | 431.8 | ($Sm_2O_3$) ($Tb_4O_7$) | 174.1 187.5 |
| 32.— $(Sm_{0.95}Yb_{0.05})_2(MoO_4)_3$ | 431.8 | ($Sm_2O_3$) ($Yb_2O_3$) | 331.3 18.7 |
| 33.— $(Sm_{0.95}Ho_{0.05})_2(MoO_4)_3$ | 431.8 | ($Sm_2O_3$) ($Ho_2O_3$) | 331.3 18.9 |
| 34.— $(Sm_{0.95}Lu_{0.05})_2(MoO_4)_3$ | 431.8 | ($Sm_2O_3$) ($Lu_2O_3$) | 331.3 19.9 |
| 35.— $(Sm_{0.95}Tm_{0.05})_2(MoO_4)_3$ | 431.8 | ($Sm_2O_3$) ($Tm_2O_3$) | 331.3 19.3 |
| 36.— $(Sm_{0.95}Sc_{0.05})_2(MoO_4)_3$ | 431.8 | ($Sm_2O_3$) ($Sc_2O_3$) | 331.3 6.9 |
| 37.— $(Sm_{0.95}Y_{0.05})_2(MoO_4)_3$ | 431.8 | ($Sm_2O_3$) ($Y_2O_3$) | 331.5 11.3 |
| 38.— $(Sm_{0.90}Er_{0.1})_2(MoO_4)_3$ | 431.8 | ($Sm_2O_3$) ($Er_2O_3$) | 313.4 19.1 |
| 39.— $(Sm_{0.6}Eu_{0.3}Er_{0.1})_2(MoO_4)_3$ | 431.8 | ($Sm_2O_2$) ($Er_2O_3$) ($Er_2O_3$) | 209.4 105.4 19.1 |
| 40.— $(Sm_{0.7}Tb_{0.2}Y_{0.1})_2(MoO_4)_3$ | 431.8 | ($Sm_2O_3$) ($Tb_4O_7$) ($Y_2O_3$) | 244.0 78.8 22.6 |
| 41.— $(Sm_{0.8}Er_{0.1}Y_{0.1})_2(MoO_4)_3$ | 431.8 | ($Sm_2O_3$) ($Y_2O_3$) ($Er_2O_3$) | 278.9 22.6 19.1 |
| 42.— $(Sm_{0.8}Dy_{0.1}Y_{0.05}Er_{0.05})_2(MoO_4)_3$ | 431.8 | ($Sm_2O_3$) ($Dy_2O_3$) ($Y_2O_3$) ($Er_2O_3$) | 278.9 37.3 11.3 9.5 |
| 43.— $(Sm_{0.5}Tb_{0.5})_2(Mo_{0.90}W_{0.1})_3$ | 388.6 | ($WO_3$) ($Sm_2O_3$) ($Tb_4O_7$) | 70.0 174.1 187.2 |
| 44.— $(Dy_{0.95}La_{0.05})_2(MoO_4)_3$ | 431.8 | ($Dy_2O_3$) ($La_2O_3$) | 369.3 16.3 |
| 45.— $(Dy_{0.95}Pr_{0.05})_2(MoO_4)_3$ | 431.8 | ($Dy_2O_3$) ($Pr_6O_{11}$) | 369.3 17.0 |
| 46.— $(Dy_{0.95}Nd_{0.05})_2(MoO_4)_3$ | 431.8 | ($Nd_2O_3$) ($Dy_2O_3$) | 16.8 369.3 |
| 47.— $(Dy_{0.8}Nd_{0.10}Ho_{0.10})_2(MoO_4)_3$ | 431.8 | ($Dy_2O_3$) ($Ho_2O_3$) ($Nd_2O_3$) | 298.4 37.8 33.7 |
| 48.— $(Eu_{0.6}Tb_{0.25}Db_{0.2})_2(MoO_4)_3$ | 431.8 | ($Eu_2O_3$) ($Dy_2O_3$) ($Tb_4O_7$) | 211.2 74.6 102.4 |
| 49.— $(Gd_{0.6}Eu_{0.2}Sm_{0.1}Tb_{0.1}Dy_{0.1})(MoO_4)_3$ | 431.8 | ($Gd_2O_3$) ($Sm_2O_3$) ($Eu_2O_3$) ($Dy_2O_3$) ($Tb_4O_7$) | 217.0 34.9 70.4 37.3 39.4 |

Figure 6:
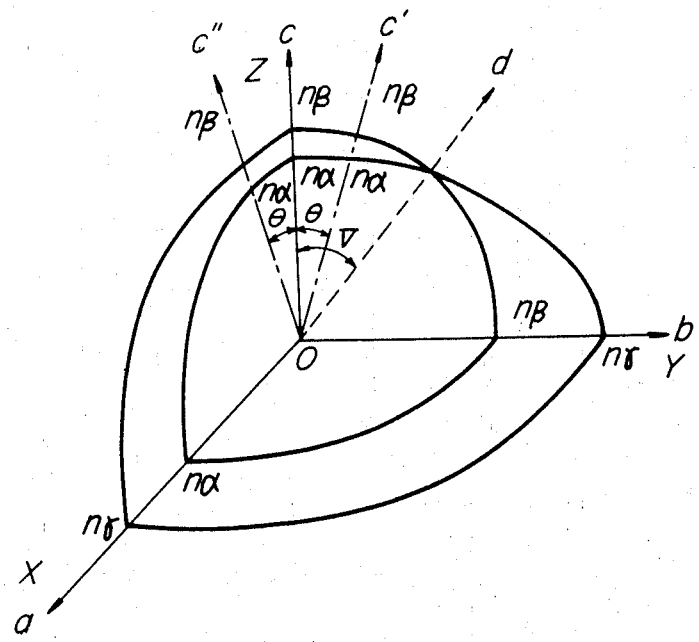
FIG. 6 is another diagram showing a section of the indicatrix ellipsoid of a biaxial birefringent crystal.

The irregular ferroelectric crystals as listed above are crystallo-optically biaxial in the ferroelectric phase. FIG. 6 shows a part of the indicatrix ellipsoid of such a crystal. In FIG. 6, axes X, Y, Z indicate optoelastic principal axes, and $n_\alpha$, $n_\beta$, $n_\gamma$ indicate refractive indexes of the lights which vibrate respectively parallel to the axes X, Y, Z.

In a GMO crystal, the opto-elastic principal axes X, Y, Z coincide with the crystallographic axes, $a$, $b$, $c$, respectively. The crystal is uniaxial and positive at a temperature above the Curie point (160°C., approximately), and its refractive indexes at 200°C. are as follows:

$n_e = 1.848$, $n_0 = 1.901$

The crystal shows the irregular ferroelectric characteristics at a temperature below the Curie point and becomes biaxial.

Optical axial angle 2V and refractive indexes $n_\alpha$, $n_\beta$, $n_\gamma$ of the crystal against Na-D rays ($\lambda = 589.3$ m$\mu$) are as follows at room temperature:

$2V \approx 11°$ $n_\alpha = 1.842$ $n_\beta = 1.843$ $n_\gamma = 1.897$ $n_\beta - n_\alpha \approx 4 \times 10^{-4}$ Optical axial plane of this biaxial positive crystal is the crystallographical $a$ plane (1 0 0), and this plane will rotate 90° around the axis $c$ if the crystal is polarized reversely. Therefore, as is seen from FIG. 6, the retardation of the light transmitted through the GMO crystal in the direction of the axis a, is given by the following formula, assuming that the thickness of the crystal is $d_a$:

$R_a = d_a (n_\gamma - n_\alpha)$ If a polarization reversal occurs in such a crystal and the plane of optical axis rotates 90° around the axis $c$, the axis $a$ is replaced by the axis $b$ and the axis $b$ by the axis $a$. Therefore, the above-mentioned retardation also changes to the following value:

$R_b = d_b (n_\gamma - n_\alpha)$ (The change in the thickness of the crystal is due to the deformation of the unit cell equivalent to 90° rotation of the axes $a$ and $b$ of the cell.) That is, the thickness as well as refractive index of the crystal change with the polarization reversal and accordingly the retardation also changes.

The retardation across a distance $d$ of the light incident to the crystal in the direction $oc'$ which is at an angle $\theta$ to the axis $c$ for example, is $d(n_\beta - n_\alpha')$. In this case, if the crystal is reversely polarized, the above-mentioned retardation will become $d(n_\beta' - n_\alpha)$ which is equivalent to the retardation in the direction $oc''$ which is on the plane $ac$ and makes the angle $\theta$ with the axis $c$ as shown in FIG. 6, as it can be deemed that the optical axial plane of the crystal has been rotated 90° around the axis $c$.

Figure 2:
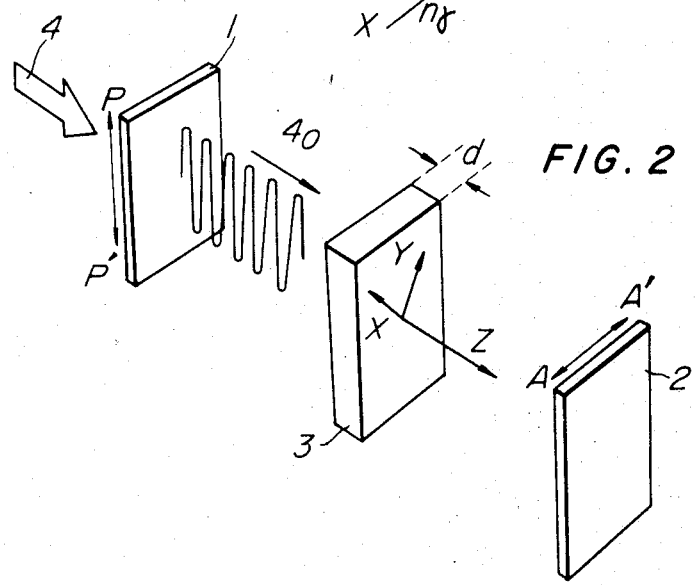
FIG. 2 is an explicative drawing of the color interference of the lights transmitted through a biaxial birefringent crystal.

If a crystal as described above is positioned between two parallel disposed polarizing plates as shown in FIG. 2 and white light 4 is directed perpendicularly to the polarizer 1, the white light $4_0$ linearly polarized through the polarizer 1 is refracted by the birefringence of the crystal 3 in various degrees depending on the component wavelength thereof, becoming circularly polarized light in a certain wavelength, linearly polarized light in another wavelength and elliptically polarized light in the other wavelengths. Of the elliptically polarized light, only the light having the same vibration plane as that of the analyser 2 is transmitted through the analyser 2 and gives an interference color. It should be noted that if the crystal is reversely polarized, thereby varying the retardation as described previously, the above-mentioned interference color also will vary according to the change of the retardation.

Assuming that the retardations in an irregular ferroelectric crystal when polarized positively and negatively are respectively $R_{(+)}$ and $R_{(-)}$;

$R_{(+)} = d_{(+)} \Delta n_{(+)}$
$R_{(-)} = d_{(-)} \Delta n_{(-)}$

Generally in an irregular ferroelectric crystal, the variation in length measured along the direction in which the deformation of the crystal is larger is as follows:

$[|d_{(+)} - d_{(-)}|]/[d_{(+)} + d_{(-)}] = 0.01 \sim 0.001$

The relation among the principal refraction indexes is:

$[n_\beta - n_\alpha]/[n_\gamma - n_\alpha] = 1 \sim 0.01$

Therefore, the interference color due to the birefringence changes with the polarization reversal of the crystal. These two particular colors are determined by the width of the crystal. Thus, a color modulator which also has the function of a color memory is obtained.

As is seen from the above description, the color modulator according to this invention is characterized in that an irregular ferroelectric crystal is positioned between two parallel disposed polarizing plates, with white light directed perpendicularly to said polarizing plates, so that a particular component wavelength determined by the difference of the retardation of the light in said crystal produces an interference color and that this interference color is modulated by reversing the polarization of said crystal with a voltage higher than the coercive electric field of said crystal or with a stress larger than the coercive stress of the crystal.

Further, if two pieces of the above-mentioned biaxial birefringent crystal are united with their principal axes of optical elasticity parallel to each other, the resultant retardation of the light transmitted through these two crystals will be equal to the sum of the respective retardations $R_1$ and $R_2$ in the component crystals. Accordingly, the interference color due to the retardation in a combination of two crystals can be modulated by changing the retardations $R_1$ and/or $R_2$ in the component crystals.

As described above, in an irregular ferroelectric crystal, the thickness $d$ as well as birefringence $\Delta n$ change with the polarization reversal. That is, the respective retardations in opposite polarizations $R_{(+)}$ and $R_{(-)}$ are expressed by the following formulas:

$R_{(+)} = dX \cdot (n_\gamma - n_\beta)$
$R_{(-)} = dY \cdot (n_\gamma - n_\alpha)$ Usually, $(dX \text{ to } dY)/(dX + dY) = 0.01 \sim 0.001$
$n_\beta - n_\alpha / n_\gamma = 1 \text{ to } 0.1$ Therefore, the interference color due to the birefringence changes with the polarization reversal in the crystal. Thus, a color modulator that can give two kinds of distinct colors which are determined by the thickness of the modulator, is obtained.

However, in the above-described GMO crystal, the variation in the dimension and the refractive index due to the polarization reversal are relatively small as shown below:

$(dX - dY)/(dX + dY) \approx 1.5 \times 10^{-3}$, $n_\beta - n_\alpha/n_\gamma \approx 2 \times 10^{-2}$ Therefore, it is difficult to obtain a broad range of color modulation with a color modulator that depends only on the variation in the birefringence due to the polarization reversal in the crystal.

According to this invention, a plurality of GMO crystals or generally irregular ferroelectric crystals joined together with their principal axes of optical elasticity parallel, are utilized so that the retardations in the component crystals are added or subtracted to effectively modulate the interference colors.

By positioning the GMO crystals or the irregular ferroelectric crystals in particular directions according to this invention, it is made possible to maintain the length $d$ of the passage of the light as well as the birefringence $n_\beta - n_\alpha$ unchanged, which is a feature very convenient for composing a color modulator. Hereunder, the principle and the composing method of such a color modulator will be described.

It is noted that when an electric field more than the coercive field is imposed on a Z-cut GMO crystal 3 to reverse the spontaneous polarization thereof, the elliptically polarized light emerging from the crystal is reversed in the direction of rotation, as the optical axial plane of the crystal is rotated 90° as a result of the polarization reversal. Therefore, the retardation before and after the polarization reversal is indicated by the same value with opposite algebraic signs.

If a transparent birefringent crystal and a Z-cut irregular ferroelectric crystal (for example, a Z-cut GMO crystal) are positioned between parallel disposed polarizer and analyser, with the Z-cut plane of the latter crystal perpendicular to the optical axis of the polarizer and with the principal axes of said two crystals respectively in the same directions, the respective retardations $R_1$ and $R_2$ in said two crystals are in an additive relation so far as the polarization of the GMO crystal is not reversed, but they become subtracted when the GMO crystal is reversely polarized by the application of an electric field. That is, the resultant retardations for the above two states are expressed by $R_1 + R_2$ and $R_1 - R_2$, respectively. Accordingly, the interference colors before and after the polarization reversal are different. This arrangement which includes a combination of at least one birefringent crystal and at least one irregular ferroelectric crystal belonging to point group $mm2$ positioned between parallel disposed polarizer and analyser, and in which an electric field is imposed on said irregular ferroelectric crystal to reverse the spontaneous polarization, can be used as a color modulator.

Further, if two Z-cut single crystals belonging to point group $mm2$ and having retardations $R_1$ and $R_2$ respectively and a birefringent crystal having a retardation $R_0$ are positioned between a polarizer and an analyser in a similar manner as described in the preceding paragraphs, and if electric fields are imposed selectively on said two single crystals belonging to point group $mm2$ to reverse the polarization thereof, there will be possible several relations of addition and reduction among the respective retardations $R_0$, $R_1$ and $R_2$ in the component crystals depending on the state of the polarization. Thus, the resultant retardation will be one of the following four combinations:

$R_0 + R_1 + R_2$     5
$R_0 - R_1 + R_2$     6
$R_0 + R_1 - R_2$     7
$R_0 - R_1 - R_2$     8

Now, a method for producing three interference colors corresponding to three primary colors, red, blue and green, (hereinafter, abbreviated as R, B and G respectively) making use of the above-described resultant retardations, will be described.

Values of the retardations $R_R$, $R_B$, $R_G$ which correspond to the three primary colors R, B, G, are given from the previously-cited Table 1 as follows:

$R_R$: 500 m$\mu$
$R_B$: 710 m$\mu$
$R_G$: 780 m$\mu$
(Interference color of the first order)

Assuming that from among the above-listed four combinations (5), (6), (7), (8), three are selected in correspondence to the above three retardations; if formulas (5), (6), (7) are selected, $R_0 + R_1 + R_2 = 780$ m$\mu$
$R_0 - R_1 + R_2 = 710$ m$\mu$
$R_0 + R_1 - R_2 = 500$ m$\mu$     9.

From the above equations,
$R_0 = 605$ m$\mu$, $R_1 = 35$ m$\mu$, $R_2 = 140$ m$\mu$     10.

If formulas (5), (6), (8) are selected,
$R_0 + R_1 + R_2 = 780$ m$\mu$
$R_0 - R_1 + R_2 = 710$ m$\mu$
$R_0 - R_1 - R_2 = 500$ m$\mu$     11.

Accordingly,
$R_0 = 640$ m$\mu$, $R_1 = 35$ m$\mu$, $R_2 = 105$ m$\mu$     12.

If formulas (6), (7), (8) are selected,
$R_0 - R_1 + R_2 = 780$ m$\mu$
$R_0 + R_1 - R_2 = 710$ m$\mu$
$R_0 - R_1 - R_2 = 500$ m$\mu$     13.

Accordingly,
$R_0 = 745$ m$\mu$, $R_1 = 105$ m$\mu$, $R_2 = 140$ m$\mu$     14.

The thicknesses of the component $mm2$ crystals to give the above required retardations (9), (12), (14) are determined by the following equations:

$R_1 = d_1 (n_\beta - n_\gamma)$
$R_2 = d_2 (n_\beta - n_\alpha)$     15.

The value of $n_\beta - n_\alpha$ of GMO crystal against Na-D rays at room temperature is $4.2 \times 10^{-4}$. Therefore, for requirements (10),
$d_1 = 82$ m$\mu$, $d_2 = 245$ m$\mu$     16.

for requirements (12),
$d_1 = 82$ m$\mu$, $d_2 = 327$ m$\mu$     17.

for requirements (14),
$d_1 = 245$ m$\mu$, $d_2 = 327$ m$\mu$     18.

Figure 12:
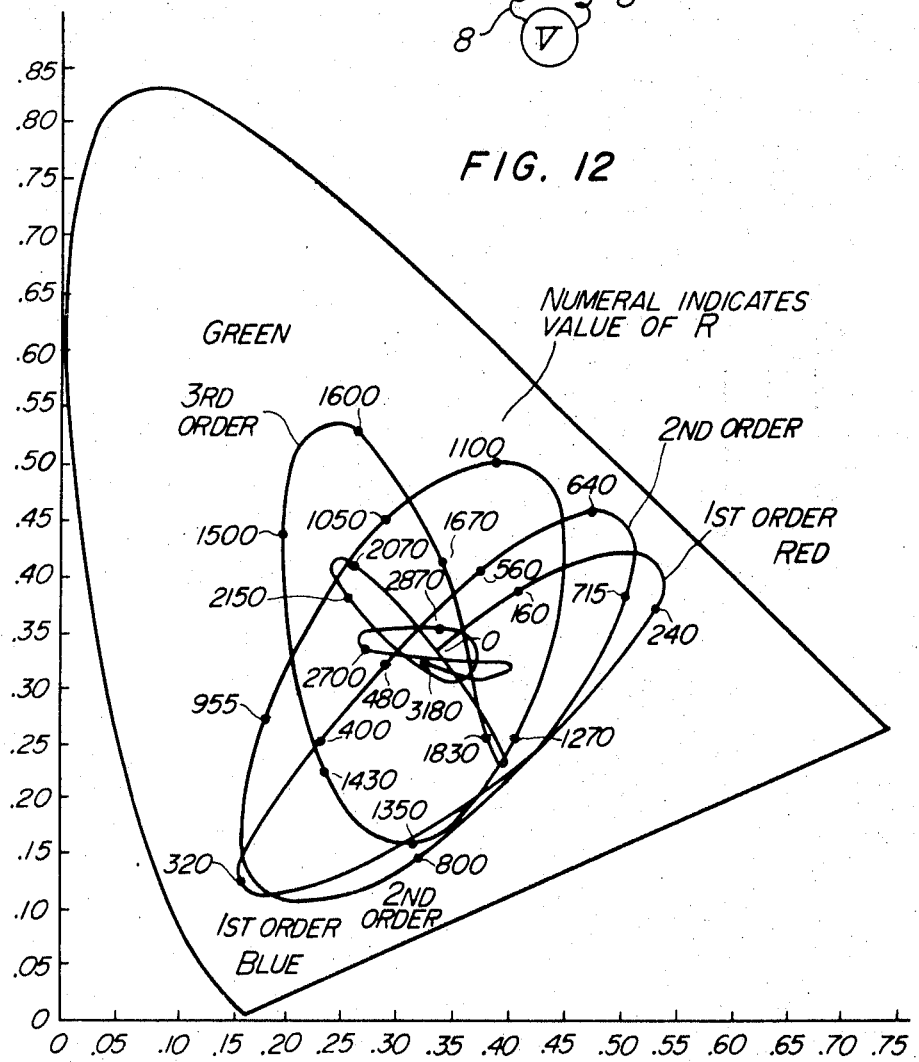
FIG. 12 is another CIE chromaticity chart indicating the same relation as shown in FIG. 11 except that the two polarizing plates are positioned in parallel-polar relation.

The above procedure for determining the requirements of a color modulator has been described in connection with primary interference colors. However, the relation between an interference color and the color value is not simple. FIGS. 11 and 12 show the results determined by means of a computer with reference to CIE chromaticity chart. As is seen from the diagrams, each color has its optimum retardation value and particular order of interference. Therefore, it is generally a difficult problem to reproduce a specified color by the interference effect due to the birefringence. With regard to this problem, a more generalized designing method will be described hereinafter in connection with Embodiment 6.

Now, several embodiments of this invention will be described in detail.

EMBODIMENT 1

Figure 7:
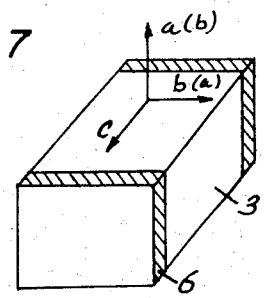
FIG. 7 is a sectional view of an irregular ferroelectric crystal used in this invention, for the explanation of the fabrication of the modulator element.
Figure 8:
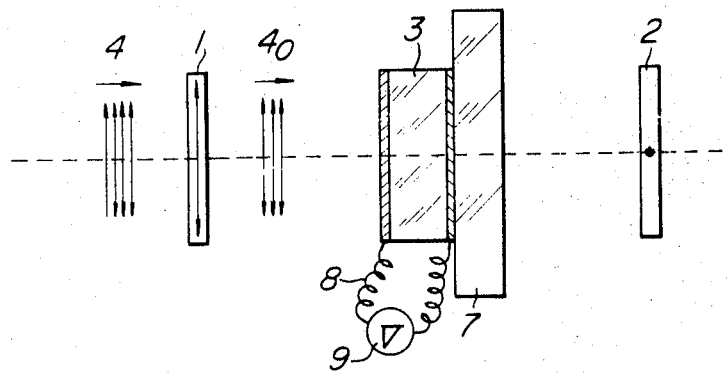
FIG. 8 is a schematic sectional view of an embodiment of the color modulator of this invention.

Referring to FIG. 7, a Y-cut piece 0.2 mm thick is cut out from a GMO single crystal 3 with a diamond cutter, and the cut surfaces are polished to clear optically flat planes. On the perpendicular surface of the c-axis is applied $SnCl_4$ coating by spraying to form transparent electrodes 6. This crystal 3 is bonded to a glass plate 7 which is 1 mm in thickness, 30 mm in width and 40 mm in length, as shown in FIG. 8. Further, a voltage source 9 is connected to leads 8 attached to the electrodes 6.

The thus formed assembly is positioned between two polarizing plates 1 and 2 which are disposed with the respective polarizing planes in crossed relation, in such a manner that the axes $a$ and $c$ of the crystal are respectively inclined against the direction of vibration of the polarizing plate 1 and the axis $b$ is perpendicular to the plane of the polarizing plate 1. Then, white light 4 is projected through the polarizer 1 toward the crystal 3. The linearly polarized light $4_0$ emerging from the polarizer 1 is transmitted through the crystal 3, and the light from said crystal 3 is elliptically polarized or, at a particular wavelength, linearly polarized because of retardations due to the lights which have component vibrations parallel to the axes $a$ and $c$. The thus polarized light is transmitted through the analyser 2 and an interference color is observed. In this state, if a voltage from the source 9 is applied to the crystal 3 through the leads 8, the interference color will change.

Though a Y-cut GMO crystal has been used in the above embodiment, it will be understood that an X-cut crystal can be used in a similar manner and with a similar effect.

As the birefringence is observed in every direction other than the optical axis, the interference color will be changed by the polarization reversal in a crystal of any type of cut. If a GMO crystal is cut in a direction deflecting from the axes $a$ and $b$ by a certain angle to obtain the required color, retardation due to birefringence depending on said angle will occur. This retardation and therefore the inteference color due to this retardation can be easily changed by reversing the polarization of the crystal, since the effective value of birefringence for the propagating light varies as a result of 90° rotation of the optical axial plane due to the polarization reversal.

Next, an example in which the axis $c$ of the crystal is defined as the optical axis will be described.

EMBODIMENT 2

In a similar manner as in Embodiment 1, a Z-cut (a cut perpendicular to the axis $c$) piece 2 mm thick is cut from a GMO single crystal with a diamond cutter and the cut surfaces are polished to optically flat planes. Both polished surfaces are coated with transparent electrodes 6 formed of a material such as $SnCl_4$, and an element 3 of 10 mm in diameter is formed. This crystal 3 is bonded to a glass plate 7 which is 1 mm thick, 30 mm wide and 40 mm long, in the same manner as in Embodiment 1. Further, leads 8 are secured to the transparent electrodes 6. The thus formed assembly is positioned, with the Z-cut plane slightly inclined, between two polarizing plates 1 and 2 which are disposed with the respective polarizing planes in crossed (or unparalleled) relation. Then, white light 4 is projected toward the crystal 3 through the polarizer 1. With such an arrangement, an interference color can be observed through the analyser 2. In this state, if a voltage higher than the coercive electric field is applied to the crystal 3 through the leads 8 to cause the polarization reversal and thereby to change the retardation, the above interference color changes. If the crystal is positioned with the Z-cut plane parallel to both polarizing plates, the interference color will not change even when the polarization is reversed. It should be noted that the same effects are obtained if, instead of positioning the crystal with the Z-cut plane slightly inclined to the polarizing plates as described above, the crystal is cut with a slight inclination against the plane perpendicular to the axis $c$ and positioned parallel to the polarizing plates. Further, assuming that the thickness of this crystal is $d$ and the difference in the refractive indexes between two extraordinary rays is $\Delta n$, the retardation R is determined by $R = d(\Delta n)$. Therefore, with a crystal of several hundred microns in thickness, the value of retardation R which gives the brightest interference color ranges from 400 m$\mu$ to 2,000 m$\mu$. If the thickness is assumed to be 200 $\mu$, then $\Delta n$ will have to be in a range of 0.002 to 0.010, in order to obtain the above-mentioned range of R. Maximum value of the refractive index of a GMO crystal is approximately 1.90 at room temperature. A conoscopic image of the $c$-cut single section of GMO crystal is deemed as a locus of the coincidental value of the birefringence (therefore, R). The lines which connect the center of the field of view and two melatopes define the tangents to the optical axial plane and indicate the direction of the axis $b$. The circumferential lines of the above two melatopes indicate the order of the interference color, the innermost line indicating interference colors of the lowest (first) order and seven colors being included between said line and the next line.

If the GMO crystal is rotated around the axis a until the incident light coincides with the curve of the first order interference color, the desired bright interference color will be obtained. In this state, if a voltage is imposed on the crystal to reverse the spontaneous polarization, the axes $a$ and $b$ are mutually interchanged. That is, the planes $a$ and $b$ rotate around the axis $c$ by 90°. Therefore, the color changes. In order to ensure that the resultant color is bright and distinct, the crystal should be rotated around the axis $b$ before the reversing voltage is applied so that the incident light will coincide with the curve of the first order interference color when the voltage is applied and the axial planes are rotated by 90°. (The required angle of rotation is almost equal to the angle by which the crystal is rotated at the beginning.) Thus, the interference color can be switched between two distinct colors by the control of the application of voltage. In the above-described color modulation system, if the two polarizing plates are positioned with their vibration planes crossed at an angle other than a right angle, further varieties of combinations will be obtained.

As described above, according to this invention, a color modulator is provided in which a color is produced from white light through the optical assembly including the GMO crystal and said color can be changed by applying a voltage or a mechanical stress to the crystal. This color modulator is advantageous in the points that the above-mentioned change of color is very distinct and the color modulation speed is high.

EMBODIMENT 3

A GMO single crystal is cut, with a diamond cutter, into a rectangular prism which is 2.5 mm thick in the direction of the axis Z and 10 mm long in the directions of the axes X and Y, and the cut surfaces are polished to transparent and optically flat planes. On the two main surfaces are provided transparent electrodes such as nesa electrodes, which are short-circuited. A polarizer is positioned perpendicular to a beam of white light converged to about 10 mm in diameter. An analyzer is positioned parallel to the polarizer in such relation that the vibration planes of both are mutually perpendicular. In this arrangement, linearly polarized light emerging from the polarizer and incident to the analyser will be intercepted by the analyser.

Then, the above-described crystal is placed between the polarizer and the analyser with the Z-axis thereof slightly inclined in relation to the optical axis of the system, so that a clear color is observed through the analyser. Further, the X-axis and Y-axis of the crystal must be on two planes which make angles of 45° with the vibration planes of the polarizer and the analyser respectively. In this state, if a pressure of approximately 400 g. is imposed flat on the Y-plane of the crystal, the crystal assumes the state of a positive or negative single domain, and the color changes to another distinct color. Then, if an approximately similar pressure is imposed on the X-plane (by which the original X-plane is indicated for the sake of simplicity of the explanation, though in fact, the original X-plane has become Y-plane after the imposition of pressure on the original Y-plane because of 90° rotation of the Y-axis), the crystal assumes the state of a negative or positive single domain, and the color returns to the initial color. Thus, the color can be changed only by the application of stress, according to this invention.

EMBODIMENT 4

An X-cut thin plate is cut from a single crystal of KDP with a diamond cutter, and the edges of the plate are cut to a width of 10 mm with two parallel planes vertical to the Z-axis. The width of the plate in the direction of the X-axis is made to 0.15 mm, the surfaces of the X-planes being finished to optical flatness, and then gold electrodes are vapor-deposited on the Z-planes. Lead wires are secured to the respective electrode with silver paste. The crystal is sandwiched, in the X-planes, between two transparent quartz plates 0.2 mm thick and the lead wires are adhered to the quartz plates with araldite. The thus composed assembly is gradually cooled and then immersed into liquid nitrogen contained in a Dewar flask which is provided with windows of quartz plates so as to permit the transmission of light. The crystal assembly is positioned with its X-plane parallel to the plane of the window. As in the Embodiment 3, two polarizing plates are positioned in a crossed nicol relationship in the path of white light, and between them is placed the Dewar flask so that the light is directed to the crystal. Thus, a color modulator unit is completed. By connecting the lead wires across a 1,000V voltage source, a distinct color is observed. If the polarity of the voltage is reversed, the color changes. The pair of the colors can be changed to any different pair of colors by rotating the polarizer or by replacing the crystal by another one of different thickness.

As mentioned previously, any ferroelectric ferroelastic crystal can be used for color modulator, though a different design is required for a particular crystal.

EMBODIMENT 5

Figure 9:
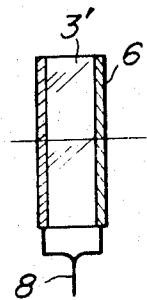
FIG. 9 is a sectional view of another embodiment of the color modulator of this invention.

Two Z-cut GMO single crystals are polished to a thickness of $254 \pm 5\mu$ and $327 \pm 5\mu$ respectively, the surfaces being finished to optically flat planes. As shown in FIG. 9, transparent electrodes 6 are formed on both Z-planes of the crystal by spraying $SnCl_4$ at 500°C. The crystals 3', 3'' are cut to the size of a 10 mm square taking advantage of cleavage along (1 1 0) plane, and lead wires 8 are attached to the electrodes. Then, each crystal is sandwiched between two glass plates 0.15 mm thick, and two such assemblies are joined with their peripheral surfaces aligned. The thus composed assembly is disposed between a polarizer and an analyser which are positioned with their vibration planes mutually perpendicular. It should be noted that the crystal assembly is positioned in such a manner that one edge thereof is parallel to the vibration plane of the polarizer. Further, a birefringent crystal 10, for example of quartz, is placed between the analyser and the crystal assembly (or between the polarizer and the crystal), with their optical axes aligned. By projecting white light onto this arrangement from the polarizer side and by applying voltages higher than the coercive electric field to the respective crystals, the color of the light emerging from the analyser can be appropriately modulated.

EMBODIMENT 6

In an arrangement consisting of a pair of polarizer and analyser and a birefringent crystal placed between them, if it is assumed that the thickness of the crystal is $d$ and the difference of the refractive indexes for two light waves vibrating in two mutually perpendicular directions is $(n_2 - n_1)$, the spectral transparency of the arrangement is given by the following formulas:

$$T_1(\lambda) = \cos^2(\pi/\lambda) R \qquad 19.$$
$$T_2(\lambda) = \sin^2(\pi/\lambda) R \qquad 20.$$

where $$R = d(n_2 - n_1)$$

The formula (19) applies to a case where the polarizing planes of the polarizer and the analyser are mutually parallel and are 45° inclined against the principal axis of the crystal. The formula (20) applies to a case where the two polarizing planes are mutually perpendicular and 45° inclined against the axis of the crystal. Therefore, when white light is introduced into such an arrangement, a clearly colored light emerges from it.

For example, in a case where the polarizing planes of the polarizer and the analyser are mutually perpendicular, it will be seen from the formula (20) that the spectral transparency assumes maximum values for the light of wavelength $\lambda$, when the following relation stands:

$$(R/\lambda)\pi = \tfrac{1}{2}\pi, 3/2\,\pi, 5/2\,\pi, \ldots (2n+1)/2\,\pi \qquad 21.$$

Further, if $$(R/\lambda)\pi = 0, \pi, 2\,\pi, \ldots n\,\pi \qquad 22.$$

the right side of the above formula (19) becomes zero. This means that no light is transmitted through the above arrangement. Thus, the above-described arrangement consisting of a birefringent crystal disposed between the crossed nicol constitutes a light filter. If it is composed so as to transmit a particular wavelength, it can be called a color filter.

According to this invention, if the previously-described technique of additive and reductive dispositions is applied to such color filters, color filters for three primary colors of R, G and B will be obtained using appropriate pairs of such filters.

For example, assuming that the respective center wavelengths of R, G and B filters are $\lambda_R$, $\lambda_G$ and $\lambda_B$; which of $(2n+1)/2$ (that is: ½, 3/2, 5/2 ...) should assume the value of $R/\lambda$ for the respective center wavelengths, is determined by the thickness $d$ of the crystal constituting the filter. The colors determined with the above values ½, 3/2, 5/2 . . . , are referred to respectively as interference color of the first order, second order, third order and so on. These interference colors define the basic conditions for determining the range of the color reproduction on the basis of the three primary colors. The optimum conditions to obtain the broadest reproduction range in the use of the three primary color filters have been described in connection with this embodiment.

As mentioned previously, in a case where the polarizing planes of the polarizer and the analyser are mutually perpendicular in the above arrangement, the spectral transparency of the system is determined by the formula (20), that is, $T_2(\lambda) = \sin^2 (R/\lambda) \pi$. Therefore, assuming that X, Y and Z are three primary colors according to the International Color Identification System, the colors are expressed theoretically as follows:

$$X = \int I(\lambda)\, \bar{x}\, d\lambda$$
$$Y = \int I(\lambda)\, \bar{y}\, d\lambda$$
$$Z = \int I(\lambda)\, \bar{z}\, d\lambda \qquad 23.$$

where $x$, $y$ and $z$ indicate co-ordinates of the spectral color. The values of $x$ and $y$ are determined from the mixing ratio of the three primary colors as follows:

$$x = (X)/(X + Y + Z)$$
$$y = (Y)/X + Y + Z) \qquad 24.$$

The above values of $x$ and $y$ are plotted on the CIE chromaticity chart. It will be seen from the curve 11 in the chart shown in FIG. 11 that as the retardation and therefore thickness of the crystal increases, first the interference colors of the first order appear in the order of orange, violet, blue and green, and then, as the crystal becomes further thicker, colors of the second order appear in the same order. Accordingly, assuming that the center wavelengths of the primary colors are as follows:

$$\lambda_R = 617\ m\mu,\ \lambda_G = 537\ m\mu,\ \lambda_B = 477\ m\mu;$$

it will be understood from FIG. 11 that the optimum range of color reproduction is obtained by choosing the thickness $d$ of the crystal and therefore the retardation so that red is obtained as the color of the first or second order, blue the second or the third order and green the second, the third or the fourth order.

As a GMO crystal belonging to the orthorhombic system of point group $mm2$ rotates its optical axial plane by 90° when an electric field or mechanical stress higher than its coercive electric field or stress is imposed thereon, the retardation R of the light transmitted through the crystal may be deemed to be reversed in the direction upon receipt of the electric field or stress, thus being indicated by −R.

Therefore, three states of retardation can be composed using two GMO crystals and an appropriate birefringent crystal (for example, a quartz crystal). Defining that the retardations required for composing colors R, G and B are $R_R$, $R_G$ and $R_B$ respectively and that the component retardations in the reference crystal (for example, the quartz crystal), the first GMO crystal and the second GMO crystal are $R_0$, $R_I$ and $R_{II}$ respectively, the following three sets of combinations are possible $$R_R = R_0 - R_I + R_{II}$$
$$R_G = R_0 + R_I - R_{II}$$
$$R_B = R_0 - R_I - R_{II} \qquad 25.$$

or $$R_R = R_0 + R_I + R_{II}$$
$$R_G = R_0 - R_I + R_{II}$$
$$R_B = R_0 + R_I - R_{II} \qquad 26.$$

or $$R_R = R_0 + R_I + R_{II}$$
$$R_G = R_0 - R_I + R_{II}$$
$$R_B = R_0 - R_I + R_{II} \qquad 27.$$

Figure 10:
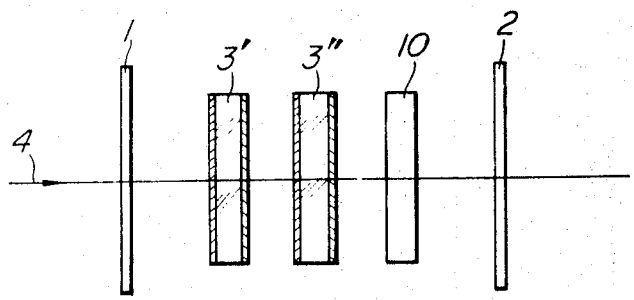
FIG. 10 is a sectional view of still another embodiment.

The three primary colors can be obtained with any of the above combinations. That is, as shown in FIG. 10, quartz plate 10, a first and a second GMO plates 3', 3'' of Z-cut, whose thicknesses are selected from one of the groups shown in Table 5, are disposed between a polarizer 1 and an analyser 2 which are positioned mutually parallel with their polarizing planes perpendicular to each other. By imposing an appropriate voltage or stress on each of the GMO plates 3', 3'' and thereby reversing the optical axes thereof, this arrangement can be used as an electrical or mechanical color filter which can transmit any of the three primary colors.

TABLE 5

| Group | Quartz plate | 1st GMO plate | 2nd GMO plate |
|---|---|---|---|
| 1 | 133 m$\mu$ | 210 m$\mu$ | 195 m$\mu$ |
| 2 | 143 | 404 | 195 |
| 3 | 122 | 210 | 404 |

The above explanation has been given in connection with a case where the polarizing planes of the polarizer and the analyser are mutually perpendicular. As to a case where said two polarizing planes are mutually parallel, it is only required to choose the thickness of the crystals sa as to provide such retardations that give red color as an interference color of the first order or the second order, blue also the first or second order and green the third or fourth order, as is clear from FIG. 12. Though a GMO crystal has been used as the color modulating element in the above embodiment, it will be understood that any crystal belonging to point group $mm2$ can be used with similar effects. Generally, a voltage of about 100V is required to actuate the crystal in the color modulator. However, this voltage can be reduced to $1/n$ by dividing the crystal into $n$ equal pieces in the direction of the thickness so as to provide the same retardation and by supplying the actuating voltage to the pieces connected parallel.

As described above, according to the method of this invention, wherein a combination consisting of crystals belonging to point group $mm2$ and another birefringent crystal are placed between two polarizing plates disposed with their polarizing planes mutually parallel or perpendicular and the polarization of said crystals belonging to point group $mm2$ is reversed with an electric field or mechanical stress higher than the coercive electric field or stress of the crystals, the color of the light incident to the arrangement is modulated.

Though a color modulator for producing the primary colors R, G and B has been described in the above embodiment, it will be understood that any other colors can be produced with a similar device if necessary. That is, as described above, retardation of light in an irregular ferroelectric crystal can be changed from a state indicated by +R to another state indicated by −R by the polarization reversal. If respective retardations in $n$ pieces of such crystals are indicated with $R_1$, $R_2$, $R_3$ ... $R_n$, the resultant retardation in an arbitrary combination of said $n$ crystals will be given by the following formula:

$$R_0 \pm R_1 \pm R_2 \pm R_3 \ldots \pm R_n$$

where $R_0$ indicates retardation in the reference crystal.

The above formula generally gives $2^n$ results. Therefore, it can be said in principle that $n$ pieces of crystals can produce $2^n$ kinds of colors. For example, in order to obtain a color modulator for 16 colors, only four pieces of irregular ferroelectric crystals are required, said pieces being finished so as to have predetermined directions of cut and dimensions and being superimposed on one another in the direction of incident light.

On the other hand, irregular ferroelectric crystals such as the above-mentioned GMO crystal have such a property that the crystal lattice thereof is deformed when the polarization is reversed. Therefore, if the polarization reversal is to be utilized for the color modulation, the electrodes applied to the crystal must satisfy the following requirements.

1. As the electrode is forced to contract and expand according to the distortion of the crystal as a result of the deformation of the crystal lattice due to the polarization reversal, the electrode must be firmly adhered to the surface so as to withstand repeated polarization reversal.

2. As the crystal is required to stably maintain the deformed state under the polarization reversal, the electrode must not act on the crystal so as to obstruct the deformation. Therefore, the electrode is required to be sufficiently thin and to have considerably low electric resistance.

3. Generally, the crystal is divided into multi-domains in the ferroelectric phase. Therefore, if the electrode is applied to the crystal in the ferroelectric phase, irregularity according to the domain pattern will occur in the layer of the electrode as a kind of deformation which is possible to affect the crystal. To prevent this, the electrode must be applied in the paraelectric phase. 4. In a device of such a constitution that the electrode is provided on the surface of the crystal, through which surface the light is transmitted, it will be needless to say that the electrode must be pervious to light.

5. In the same case as in the preceding paragraph (4), if the incident light is white and the interference color caused by the crystal is to be utilized, the electrode must not be of such material that may affect the interference color.

6. The material of the electrode must be stable chemically as well as physically to ensure a long operation life.

Generally, the following techniques or substances may be used for the electrode applied to the ferroelectric crystal for the polarization reversal.

a. Application of metallic foil
b. Evaporation of metal
c. Application and high temperature drying of silver paste or the like
d. Electrolysis plating of metal
e. Mercury electrode
f. Application of non-metallic particles such as carbon powder (for example, Aquadag (Trade name))
g. Liquid electrode The following table shows in what degrees the above-listed electrodes (a) to (g) fulfill the previously stated requirements (1) to (6). In the table, mark $o$ indicates that the electrode substantially fulfills that requirement, mark $x$ indicates that the requirement is not satisfied, and mark $\Delta$ indicates that it does not necessarily satisfy the requirement, neither impair the function of the crystal.

|     | (a) | (b) | (c) | (d) | (e) | (f) | (g) |
| --- | --- | --- | --- | --- | --- | --- | --- |
| (1) | $x$ | $x$ | $o$ | $x$ | $\Delta$ | $x$ | $\Delta$ |
| (2) | $o$ | $o$ | $x$ | $o$ | $o$ | $o$ | $\Delta$ |
| (3) | $x$ | $\Delta$ | $o$ | $x$ | $\Delta$ | $\Delta$ | $x$ |
| (4) | $x$ | $x$ | $x$ | $x$ | $x$ | $x$ | $o$ |
| (5) | $x$ | $x$ | $x$ | $x$ | $x$ | $x$ | $o$ |
| (6) | $x$ | $\Delta$ | $o$ | $o$ | $\Delta$ | $x$ | $x$ |

As is seen from the above table, among the various types of electrodes (a) to (g) none fulfills all of the requirements (1) to (6). Though the liquid electrode (g) is barely satisfactory, it does not assure a long operation life and is inconvenient to apply.

To overcome the above-described disadvantages of the conventional electrode, new types of electrode are used in this invention, which will be described by the following three embodiments.

EMBODIMENT 7

A GMO crystal which is cut perpendicular to the c-axis and polished to an optical flatness with diamond paste to be finished to a transparent plate of $200\mu$ thick and approximately 1 cm square, is heated to 500°C. at a rate of temperature rise of about 5°C./minute and maintained at 500°C. ± 50° for 10 minutes. Then, by spraying a solution containing $SnCl_4$ as the main ingredient onto the crystal for 3 to 5 minutes at the same temperature, a nesa coating containing $SnO_2$ as the main component is formed on one surface of the crystal. After the crystal is maintained at the same temperature further for about 10 minutes, it is cooled at a rate of 5°C./minute to 100°C. or lower. Another electrode is applied to the opposite surface of the crystal according to the same procedure as described above.

EMBODIMENT 8

An opaque film of In approximately 500 A in thickness is formed by evaporation on the surface of a GMO crystal of the same formation as described in the above Embodiment 7, and this coated crystal is heated to a temperature of 160° to 200°C. in the ambient atmosphere, being followed by gradual cooling. By this process, a transparent electrode mainly consisting of $InO_2$ is obtained.

EMBODIMENT 9

A GMO crystal prepared in the same manner as described above and having In coating deposited by evaporation on its surface, is put in a vessel which contains about 400 cc of ethylene glycol saturated with sodium nitrate. The In coated surface is anodized by electrolysis, said In coating being used as the anode and a carbon electrode as cathode. After 2 to 3 minutes' anodizing; a transparent electrode mainly consisting of $InO_2$ is obtained.

Figure 13:
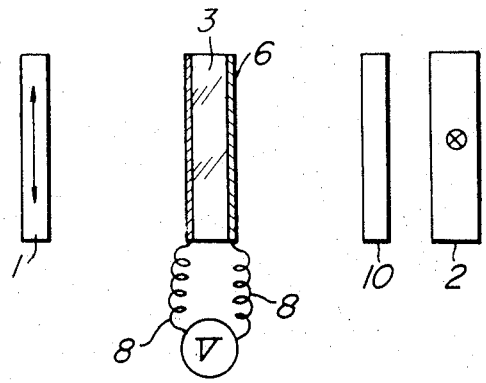
FIG. 13 is a sectional view of an embodiment of this invention used for testing the transparent electrode attached to the irregular ferroelectric body.

The thin film formed according to the process of the above Embodiment 7, 8 or 9, had a thickness of about 300 to 800 A and an electric resistance of several tens ohm to a few hundreds ohm as determined with a point contact probe. After unnecessary coating was removed from the peripheral surfaces of the crystal plate, lead wires 8 were connected to the electrodes 6 as shown in FIG. 13 and a voltage was applied through the lead wires 8. It was noted that the crystal assumed the state of single domain when the voltage rose to approximately 100V. This crystal was placed between the crossed Nicols 1, 2 along with a mica plate 10' having a retardation of about 600 m$\mu$, and when a voltage was imposed on the crystal alternately in the positive and negative directions, colors changing according to the change in the polarity of the voltage were observed. Further, twenty such crystals having dimensions of 10 mm × 20 mm × 0.3 mm and provided with the above-described electrodes were kept under imposition of a voltage of 50 Hz, 130V. After a continuous test for 100 hours, no change was observed, indicating the stability of the electrodes.

Though the electric resistance and transparency did not show any change in the electrodes prepared according to the above Embodiment 7, the resistance of those prepared according to Embodiment 9 was noted to increase to about two times as high as the initial value, while the transparency remained unchanged. As to the thickness, the electrodes prepared by Embodiment 7 caused a slight deformation in the crystal if the thickness exceeded $1\mu$. However, in the electrodes prepared according to Embodiment 8 or 9, no such deformation was found even in those of $3\mu$ in thickness.

What we claim is:

1. An apparatus for color modulating a beam of light incident thereon comprising:

first and second means, each having a respective polarizing plane, for polarizing said beam of light;

a biaxial birefringent irregular ferroelectric crystal disposed between said first and second means and having a plane defined by two crystallographic axes thereof, perpendicular to one of said respective polarizing planes, while one of said crystallographic axes of said crystal intersects said one respective polarizing plane; and means for modulating the interference color of the ordinary and extraordinary light ray portions of said incident light transmitted through said crystal and each of said first and second polarizing means, comprising means for imparting to said crystal a force at least equal in intensity to the threshold level of the coercivity of said crystal, to thereby cause spontaneous polarization reversal within said crystal.

2. An apparatus in accordance with claim 1, wherein said imparting means comprises means, disposed on a pair of opposite surfaces of said crystal, for impressing thereacross an electric field at least equal in intensity to the coercive electric field of said crystal.

3. An apparatus according to claim 2, wherein said birefringent irregular ferroelectric crystal is a crystal having the structure of gadolinium molybdate expressible by the following chemical formula:

$(R_xR'_{1-x})_2 O_3 \cdot 3Mo_{1-e} W_e O_3$ where R and R' respectively indicate at least one element of rare earths, $x$ a number of 0 to 1.0, and $e$ a number of 0 to 0.2.

4. An apparatus in accordance with claim 1, wherein said imparting means comprises means, disposed on a pair of opposite surfaces of said crystal, for imparting across said crystal a stress at least equal in intensity to the coercive stress of said crystal.

5. An apparatus according to claim 4, wherein said birefringent irregular ferroelectric crystal is a crystal having the structure of gadolinium molybdate expressible by the following chemical formula:

$(R_xR'_{1-x})_2 O_3 \cdot 3Mo_{1-e} W_e O_3$ where R and R' respectively indicate at least one element of rare earths, $x$ a number of 0 to 1.0, and $e$ a number of 0 to 0.2.

6. An apparatus according to claim 1, wherein said birefringent irregular ferroelectric crystal is a crystal having the structure of gadolinium molybdate expressible by the following chemical formula:

$(R_xR'_{1-x})_2 O_3 \cdot 3Mo_{1-e} W_e O_3$ where R and R' respectively indicate at least one element of rare earths, $x$ a number of 0 to 1.0, and $e$ a number of 0 to 0.2.

7. A color modulator device comprising a birefringent irregular ferroelectric crystal, said crystal having a pair of opposite surfaces perpendicular to a crystallographic axis selected from the $a$-axis and the $b$-axis of said crystal, a pair of electrodes provided respectively on a pair of opposite surfaces perpendicular to the $c$-axis of said crystal, means for imposing on said crystal an electric field at least equal in intensity to the coercive electric field of said crystal through said electrodes, and means, disposed adjacent said crystal, for polarizing light passing through said crystal.

8. A color modulator device according to claim 7, wherein said polarizing means comprises means for projecting linearly polarized white light to said crystal with the oscillation plane of the polarized light inclined in relation to two crystallographic axes in said opposite surfaces of said birefringent irregular ferroelectric crystal, and polarizing means for analyzing said linearly polarized white light after said light is transmitted through said crystal.

9. An apparatus according to claim 8, wherein said birefringent irregular ferroelectric crystal is a crystal having the structure of gadolinium molybdate expressible by the following formula:

$(R_xR'_{1-x})_2 O_3 \cdot 3Mo_{1-e} W_e O_3$ where R and R' respectively indicate at least one rare earth element, $x$ a number of 0 to 1.0 and $e$ a number of 0 to 0.2.

10. A color modulator device according to claim 7, wherein said birefringent irregular ferroelectric crystal is a crystal having the structure of gadolinium molybdate expressible by the following chemical formula:

$(R_xR'_{1-x})_2 O_3 \cdot 3Mo_{1-e} W_e O_3$ where R and R' respectively indicate at least one element of rare earths, $x$ a number of 0 to 1.0, and $e$ a number of 0 to 0.2.

11. A color modulator device according to claim 10, wherein said polarizing means comprises means for projecting linearly polarized white light to said crystal with the oscillation plane of the polarized light inclined in relation to two crystallographic axes in said opposite surfaces of said birefringent irregular ferroelectric crystal and polarizing means for analyzing said linearly polarizied white light after said light is transmitted through said crystal.

12. A color modulator device comprising two birefringent irregular ferroelectric crystals each having a pair of opposite surfaces perpendicular to the $c$-axis of said crystal, a pair of electrodes provided on said pair of opposite surfaces of each of said crystals, and means for imposing an electric field on each of said crystals through said electrodes, said electric field being at least equal in intensity to the coercive electric field of the crystals, said crystals being disposed in sequential order and with said pair of opposite surfaces perpendicular to linearly polarized incident light.

13. A color modulator device according to claim 12, further comprising means for projecting linearly polarized white light to said crystals with the oscillation plane of the polarized light inclined in relation to two crystallographic axes in said opposite surfaces of said birefringent irregular ferroelectric crystals, and polarizing means for analyzing said linearly polarized white light after said light is transmitted through said crystals.

14. An apparatus according to claim 13, wherein said birefringent irregular ferroelectric crystal is a crystal having the structure of gadolinium molybdate expressible by the following formula:

$(R_xR'_{1-x})_2 O_3 \cdot 3Mo_{1-e} W_e O_3$ where R and R' respectively indicate at least one rare earth element, $x$ a number of 0 to 1.0 and $e$ a number of 0 to 0.2.

15. A color modulator device according to claim 12, wherein said birefringent irregular ferroelectric crystals are crystals having the structure of gadolinium molybdate expressible by the following chemical formula:

$(R_xR'_{1-x})_2 O_3 \cdot 3Mo_{1-e} 22 W_e O_3$ where R and R' respectively indicate at least one element of rare earths, $x$ a number of 0 to 1.0, and $e$ a number of 0 to 0.2.

16. A color modulator device according to claim 15, further comprising means for projecting linearly polarized white light to said crystals with the oscillation plane of the polarized light inclined in relation to two crystallographic axes in said opposite surfaces of said birefringent irregular ferroelectric crystals, and polarizing means for analyzing said linearly polarized white light after said light is transmitted through said crystals.

17. A color modulator device according to claim 12, wherein said pair of electrodes are formed of a dioxide selected from the group consisting of S$n$ and T$n$.

18. A color modulator device comprising two birefringent irregular ferroelectric crystals each having a pair of opposite surfaces perpendicular to the $c$-axis of said crystal, a pair of electrodes provided on said pair of opposite surfaces of each of said crystals, means for imposing an electric field on each of said crystals through said electrodes, said electric field being at least equal in intensity to the coercive electric field of the crystals, and a birefringent crystal having a pair of opposite and parallel surfaces, said birefringent irregular ferroelectric crystals being disposed in sequential order and with said pair of opposite surfaces perpendicular to a linearly polarized incident light.

19. A color modulator device according to claim 18, further comprising means for projecting linearly polarized white light to said crystals with the oscillation plane of the polarized light inclined in relation to two crystallographic axes in said opposite surfaces of said birefringent irregular ferroelectric crystals, and polarizing means for analyzing said linearly polarized white light after said light is transmitted through said crystals.

20. A color modulator device according to claim 19, wherein the thicknesses of said birefringent irregular ferroelectric crystals in the direction of the $c$-axis are selected so that the resultant retardation of the birefringent light transmitted through said birefringent irregular ferroelectric crystals and said birefringent crystal produces a red color as the interference color of the second order or the first order, a blue color as the third order or the second order, or a green color as the third order or the second order.

21. A color modulator device according to claim 20, wherein said birefringent irregular ferroelectric crystals are crystals having the structure of gadolinium molybdate expressible by the following chemical formula:

$(R_xR'_{1-x})_2 O_3 \cdot 3Mo_{1-e} W_e 115 O_3$ where R and R' respectively indicate at least one element of rare earths, $x$ a number of 0 to 1.0, and $e$ a number of 0 to 0.2.

22. A color modulator device according to claim 19, wherein the thicknesses of said birefringent irregular ferroelectric crystals in the direction of the $c$-axis are selected so that the resultant retardation of the birefringent light transmitted through said birefringent irregular ferroelectric crystals and said birefringent crystal produces a red color as the interference color of the second order or the first order, a blue color as the second order or the first order, or a green color as the fourth order or the third order.

23. A color modulator device according to claim 22, wherein said birefringent irregular ferroelectric crystals are crystals having the structure of gadolinium molybdate expressible by the following chemical formula:

$(R_xR'_{1-x})_2 O_3 \cdot 3Mo_{1-e} W_e O_3$ where R and R' respectively indicate at least one element of rare earths, $x$ a number of 0 to 1.0, and $e$ a number of 0 to 0.2.

24. An apparatus according to claim 19, wherein said birefringent irregular ferroelectric crystal is a crystal having the structure of gadolinium molybdate expressible by the following formula:

$(R_xR'_{1-x})_2 O_3 \cdot 3Mo_{1-e} W_e O_3$ where R and R' respectively indicate at least one rare earth element, $x$ a number of 0 to 1.0 and $e$ a number of 0 to 0.2.

25. A color modulator device according to claim 18, wherein said birefringent irregular ferroelectric crystals are crystals having the structure of gadolinium molybdate expressible by the following chemical formula:

$(R_xR'_{1-x})_2 O_3 \cdot 3Mo_{1-e} W_e O_3$ where R and R' respectively indicate at least one element of rare earths, $x$ a number of 0 to 1.0, and $e$ a number of 0 to 0.2.

26. A color modulator device according to claim 25, further comprising means for projecting linearly polarized white light to said crystals with the oscillation plane of the polarized light inclined in relation to two crystallographic axes in said opposite surfaces of said birefringent irregular ferroelectric crystals, and polarizing means for analyzing said linearly polarized white light after said light is transmitted through said crystals.

27. A color modulator device comprising a birefringent irregular ferroelectric crystal having a pair of opposite surfaces similarly inclined in relation to the $c$-axis of the crystal, a pair of electrodes provided on said pair of opposite surfaces, means for imposing an electric field on said crystal through said electrodes, said electric field being at least equal in intensity to the coercive electric field of said crystal, and means, disposed adjacent to said crystal, for polarizing light passing through said crystal.

28. A color modulator device according to claim 27, wherein said polarizing means comprises means for projecting linearly polarized white light to said crystal with the oscillation plane of the polarized light inclined in relation to two crystallographic axes in said opposite surfaces of said birefringent irregular ferroelectric crystal, and polarizing means for analyzing said linearly polarized white light after said light is transmitted through said crystal.

29. An apparatus according to claim 28, wherein said birefringent irregular ferroelectric crystal is a crystal having the structure of gadolinium molybdate expressible by the following formula:

$$(R_xR'_{1-x})_2 O_3 \cdot 3Mo_{1-e} W_e O_3$$

where R and R' respectively indicate at least one rare earth element, $x$ a number of 0 to 1.0 and $e$ a number of 0 to 0.2.

30. A color modulator device according to claim 27, wherein said birefringent irregular ferroelectric crystal is a crystal having the structure of gadolinium molybdate expressible by the following chemical formula:

$$(R_xR'_{1-x})_2 O_3 \cdot 3Mo_{1-e} W_e O_3$$

where R and R' respectively indicate at least one element of rare earths, $x$ a number of 0 to 1.0, and $e$ a number of 0 to 0.2.

31. A color modulator device according to claim 30, wherein said polarizing means comprises means for projecting linearly polarized white light to said crystal with the oscillation plane of the polarized light inclined in relation to two crystallographic axes in said opposite surfaces of said birefringent irregular ferroelectric crystal, and polarizing means for analyzing said linearly polarized white light after said light is transmitted through said crystal.

* * * * *